United States Patent [19]

Grass et al.

[11] Patent Number: 5,047,604
[45] Date of Patent: Sep. 10, 1991

[54] ADAPTER PROVIDING UNITARY MOUNTING CAPABILITY FOR STANDARD CIRCUIT BREAKER

[75] Inventors: William E. Grass, Whitefish Bay; Robert J. Clarey, Brookfield, both of Wis.

[73] Assignee: Eaton Corporation, Cleveland, Ohio

[21] Appl. No.: 499,137

[22] Filed: Mar. 27, 1990

[51] Int. Cl.$^5$ .......................... H02B 1/10; H01R 9/16
[52] U.S. Cl. ..................................... 200/294; 200/295; 361/353
[58] Field of Search ....................... 200/294, 295, 296; 361/341, 343, 355, 361, 376, 378, 353, 346, 331

[56] References Cited

U.S. PATENT DOCUMENTS

| | | | |
|---|---|---|---|
| 3,694,701 | 9/1972 | Stanback | 361/353 |
| 4,167,769 | 9/1979 | Luke et al. | 361/355 |
| 4,222,019 | 9/1980 | Rusch | 335/6 |
| 4,251,851 | 2/1981 | Diersing et al. | 361/363 |
| 4,672,508 | 6/1987 | Bridges | 361/353 |
| 4,825,338 | 4/1989 | Hubbard et al. | 361/376 |
| 4,900,275 | 2/1990 | Fasano | 439/716 |

FOREIGN PATENT DOCUMENTS

| | | | |
|---|---|---|---|
| 1937101 | 1/1971 | Fed. Rep. of Germany | 361/376 |
| 2510807 | 9/1976 | Fed. Rep. of Germany | 361/376 |
| 2510815 | 9/1976 | Fed. Rep. of Germany | 361/376 |

OTHER PUBLICATIONS

Drawing B17-18199 dated 4/24/84 entitled "Base Assembly".
Westinghouse Electric Corporation Technical Data 29-120 p. 16.5, dated Sep. 1987.

Primary Examiner—Ernest G. Cusick
Attorney, Agent, or Firm—L. G. Vande Zande

[57] ABSTRACT

An adapter converting a standard plug-on, bolt-in power distribution panelboard type circuit breaker for use in industrial control applications comprises a molded insulating base having a rail engaged by a hook of the circuit breaker and a conductor having a first terminal compatible with the circuit breaker terminal and a second terminal comprising a wiring connector. The adapter is mountable to a panel or within an enclosure, flat against a panel or on a DIN rail or is attached to the breaker when the latter is front-mounted to a door or panel. A snap-on catch for mounting plate and DIN rail mounting is deflectable by an attached breaker to pinch the grip of the catch on the plate or DIN rail to prevent lateral movement, and by a screwdriver or the like from the front to release the base from the plate or rail. The plate accommodates plural bases in ganged relation to provide multiple capability mountable as a unit.

17 Claims, 2 Drawing Sheets

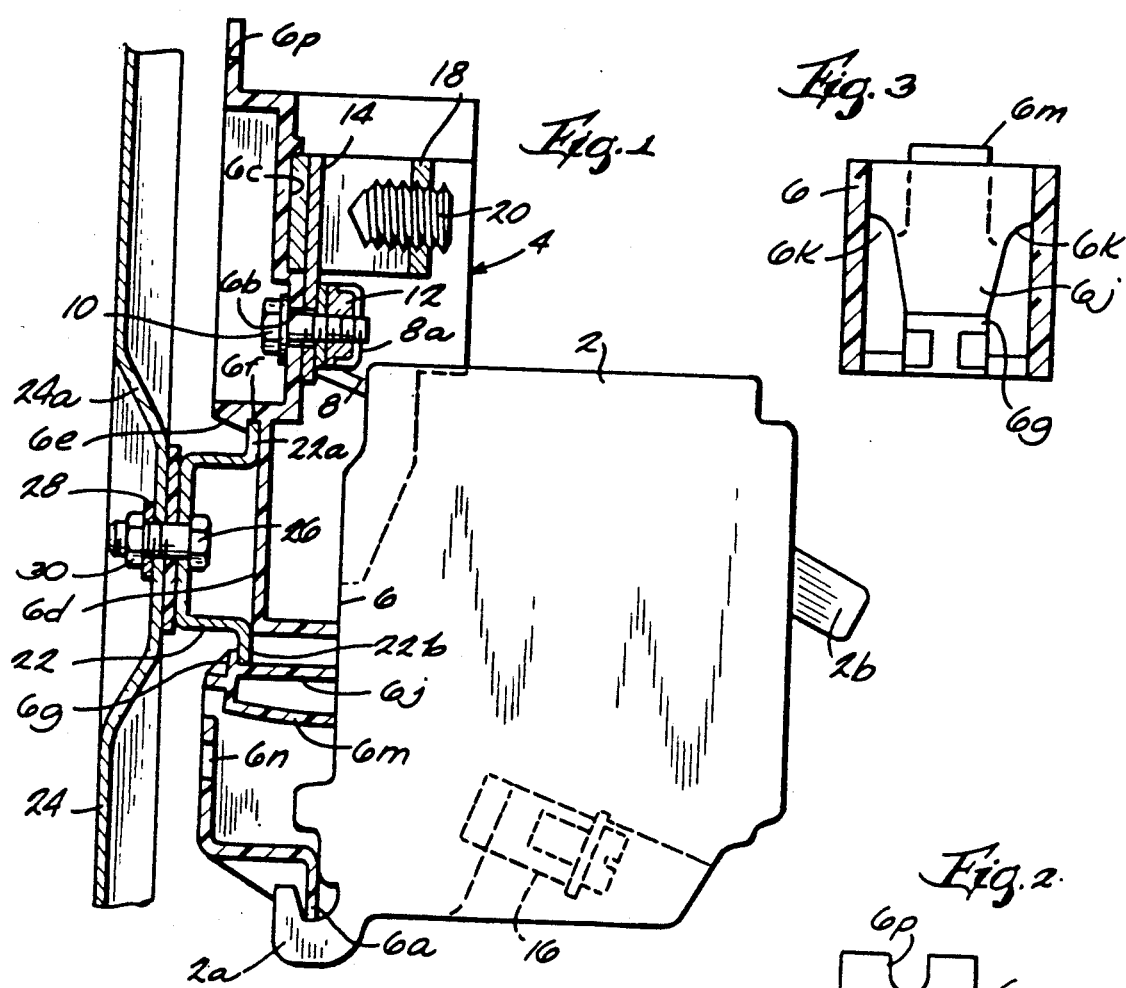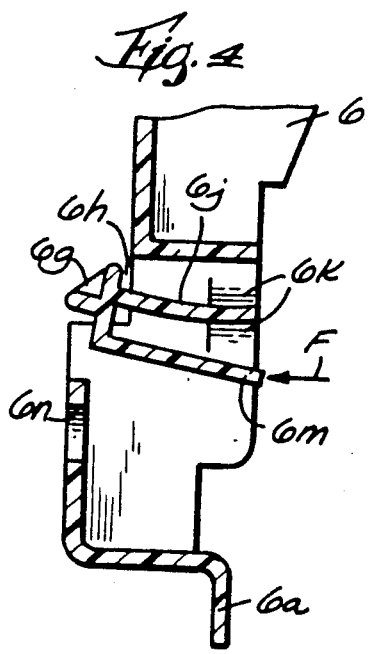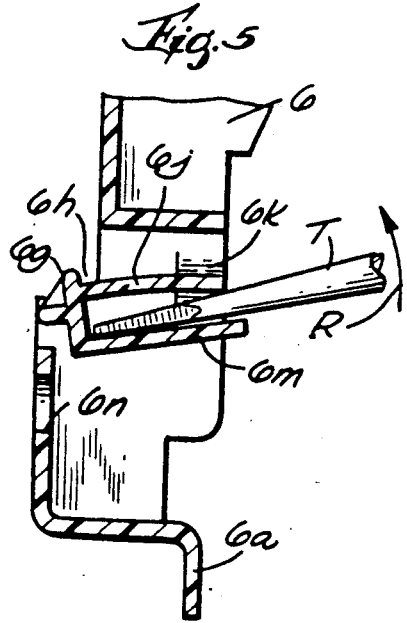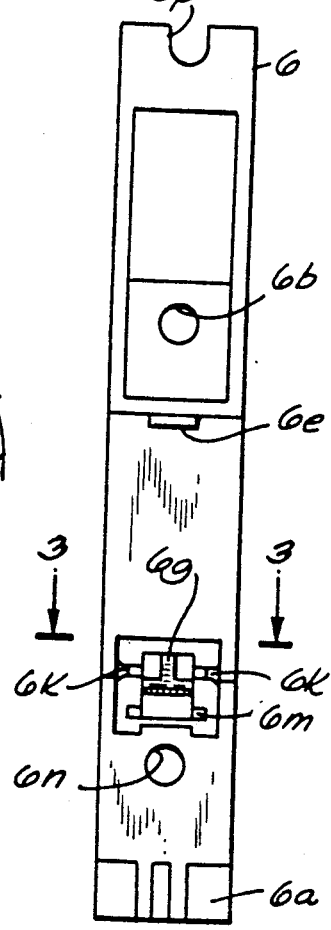

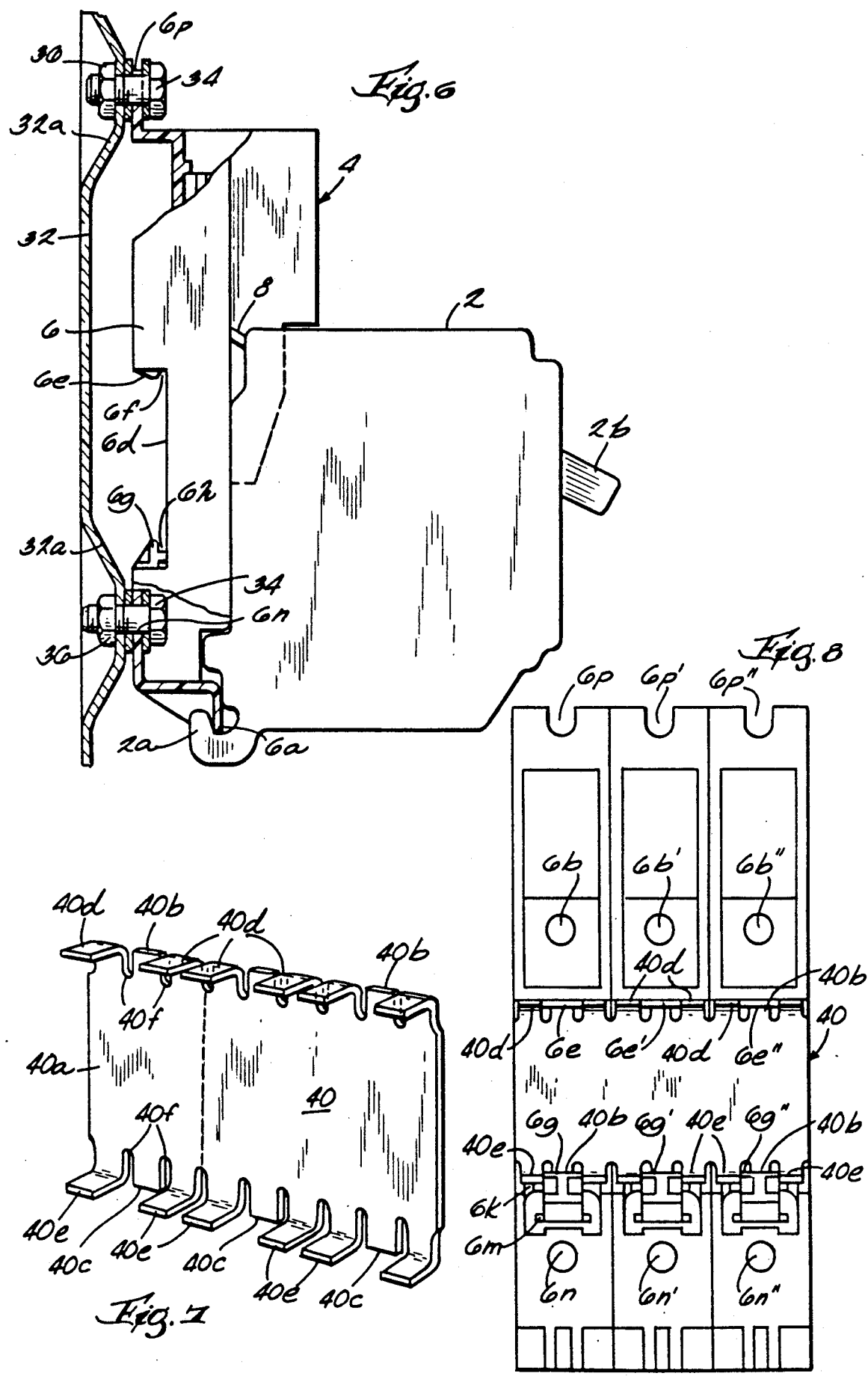

ADAPTER PROVIDING UNITARY MOUNTING CAPABILITY FOR STANDARD CIRCUIT BREAKER

BACKGROUND OF THE INVENTION

This invention pertains to circuit breakers providing thermal and magnetic trip in response to overload currents, such breakers being adapted for plug-in or bolt-in mounting on a distribution panelboard bus structure to protect branch circuits and connected apparatus emanating from the distribution panelboard. Particularly, this invention relates to an adapter which directly receives a standard circuit breaker of the aforementioned type and permits use of such breaker in an industrial control panel, motor control enclosure or other electrical control apparatus which does not have the bus structure of the distribution panelboard, but is hard-wired. More particularly, the invention relates to an adapter of the aforementioned type which itself has provisions for mounting on a panel or a DIN rail to function as a mounting base for a circuit breaker of the aforementioned type.

Certain motor control installations require thermal and magnetic protection for a motor. A motor circuit protector in combination with an overload relay will provide such protection at a sacrifice of panel surface area and apparatus cost. In many instances, circuit breakers of the type used for branch lighting and appliance circuits provide thermal and magnetic trip protection within the specifications of the particular motor. In addition, the circuit breaker can provide a disconnect function for the motor control circuit. Thus, panel builders and contractors often have need to place an individual or multi-pole circuit breaker in or on a panelboard or within a motor control enclosure.

Space is usually at a premium on or in panels or within electrical apparatus enclosures which greatly limits the location and type of mounting of the circuit breaker. DIN rails may be provided on or in panels and electrical apparatus enclosures for mounting motor control components, e.g. contactors, relays, overload relays, and it is convenient to be able to mount a circuit breaker to the same DIN rail structure. Manufacturers of circuit breakers, particularly European manufacturers, specially provide circuit breakers having a DIN rail mounting structure integrally molded in the case of the circuit breaker. The European style circuit breaker does not have plug-in or bolt-in connection with a distribution panelboard bus structure, but instead is provided with wiring connector terminals at opposite ends and may therefore be directly utilized in the motor control application. Domestic circuit breaker manufacturers also provide special circuit breakers for this motor control application which replace the plug-in or bolt-in type line side terminal with a wiring connector terminal. This substitution of terminal elements also requires different insulating case and cover members.

DIN rail mounting structures on circuit breakers or other molded case control apparatus comprise snap-on mounting and generally rely on a friction grip of the rail to prevent lateral sliding of the control apparatus along the rail. Spring biased elements for increasing the gripping force have been provided to improve the grip on the rail at increased cost of the apparatus.

SUMMARY OF THE INVENTION

This invention provides an adapter connected to a circuit breaker of the type for bolt-on or plug-on connection to the bus structure of a power distribution panelboard, the adapter comprising an electrical conductor having a first terminal means cooperably connected to the circuit breaker terminal and a second terminal means providing a wiring connector, and means structurally cooperable with the circuit breaker securing the circuit breaker to the adapter in collaboration with interconnection of the terminal means. The adapter may be directly mounted to a panel or may be mounted to a DIN rail or may be used solely to provide the wiring connector terminal in applications where the breaker is front mounted to a panel, enclosure door or the like. A flexible catch member of the adapter for DIN rail mounting may be deflected by a tool from the front of the adapter to release the adapter from the DIN rail and is deflected inwardly against the DIN rail by a breaker connected to the adapter, the deflected catch providing increased gripping force on the DIN rail to prevent lateral movement of the adapter along the DIN rail. The invention also provides a separate mounting plate which may be used in conjunction with the DIN rail catch to provide a multi-pole circuit breaker assembly adapted for mounting on or in the electrical panel or enclosure as a unit. This invention, its features and advantages will become more readily apparent when reading the following description and appended claims in conjunction with the accompanying drawings.

BRIEF DESCRIPTION OF THE DRAWINGS

FIG. 1 is a cross sectional view of the adapter of this invention mounted on a DIN rail and having a standard circuit breaker attached thereto;

FIG. 2 is a plan view of the back side of the adapter of FIG. 1;

FIG. 3 is a cross sectional view of the adapter taken along line 3—3 in FIG. 2;

FIG. 4 is a fragmentary cross sectional view of the adapter of this invention showing a force applied to a flexible catch member to increase the gripping force on a mounting plate such as a DIN rail;

FIG. 5 is a fragmentary cross sectional view similar to FIG. 4, but showing the flexible latch member deflected in an opposite direction by a tool for releasing the adapter from a mounting plate such as a DIN rail;

FIG. 6 is a view similar to FIG. 1 showing a direct method of mounting the adapter to a panel and showing the adapter in side elevation with portions broken away at opposite ends;

FIG. 7 is a perspective view of a mounting plate used to mount a plurality of adapters together as a unitary ganged assembly; and FIG. 8 is a plan view of the back side of the plate of FIG. 7 with three adapters mounted thereon.

DETAILED DESCRIPTION OF THE PREFERRED EMBODIMENT

A molded case, overload responsive circuit breaker 2 is shown in side elevation in FIG. 1 attached to the mounting base 6 of an adapter assembly 4. Circuit breaker 2 has a hook 2a formed at its lower rear corner (as oriented in the drawing) for hooking over the edge of a rail 6a on mounting base 6. With hook 2a so engaged, breaker 2 is pivoted counterclockwise about rail 6a to bring a terminal 8 into alignment with a forwardly projecting threaded shank of screw 10. Terminal 8 is of the type described and claimed U.S. Pat. No. 4,905,122 issued Feb. 27, 1990 to T. E. Culnan and L. L. Hall, II, and assigned to the assignee of this invention, which patent is incorporated herein by reference. Terminal 8 includes upturned side rails 8a which loosely entrap a nut 12 in aligned position with screw 10 so that the nut may be secured tightly on screw 10, clamping terminal 8 against a conductor 14. Circuit breaker 2 is of the type adapted to be mounted within a panelboard by making bolted connection with a bus structure of the panelboard such as is shown in U.S. Pat. No. 4,358,815 issued Nov. 9, 1982 to H. E. Koslosky et al and assigned to the assignee of this application. In addition to the terminal 8, which may alternatively be of a type to make plug-on connection with a corresponding forwardly projecting peg from a modified conductor, breaker 2 has a second terminal 16 which comprises a screw driven pressure type wiring connector. Breaker 2 has an operating handle 2b which may be manually operated to actuate an internal mechanism between contact open and contact closed positions. Moreover, breaker 2 contains a latch trip mechanism responsive to thermal and magnetic reactions to current flow between the terminals 8 and 16.

Mounting base 6 is a long essentially rectangular member molded of a plastic insulating material or the like. Screw 10 passes through a hole 6b near the upper end of base 6 to threadably engage conductor 14, firmly securing conductor 14 against a front surface of base 6. Conductor 14 extends within the central opening of a lug wiring 18 which is positioned within a rectangular recess 6c in the front surface of base 6 to retain the lug 18 in place on base 6. Lug 18 has a screw 20 which is threaded into the center opening of the lug to compress wires inserted therein against the side of the lug and against conductor 14 to hard-wire the adapter to a power source.

Adapter 4 and circuit breaker 2 are shown in FIG. 1 mounted to a panel or enclosure wall 24. A DIN rail mounting member 22 comprising a U-shaped channel, the outer ends of which are bent outwardly to provide oppositely directed flanges 22a and 22b, is attached to the panel or wall 24 by screws 26 extending through aligned holes in the base of DIN rail 22 and panel or wall 24 and through a washer 28 to threadably engage a nut 30. Panel or wall 24 may have frusto-conical bosses 24a projecting forwardly at the area through which screw 26 extends so as to accommodate the projecting shank of screw 26, washer 28 and nut 30 without extending beyond the back plane of the panel or wall. The back surface of mounting base 6 has a recessed area 6d. A beveled tab 6e is provided on an upper end wall of the recessed area 6d, the tab 6e being spaced rearwardly to define a slot 6f as best seen in FIG. 6. Base member 6 is provided with a catch 6g at the lower end of recessed area 6d, catch 6g being spaced rearwardly to define a slot 6h (FIG. 6). Catch 6g is provided on the distal end of a resilient cantilever web 6j which is integrally connected with side walls of the base at 6k (FIG. 3) at the forward end of web 6j. An integral L-shaped member 6m projects from the distal end of cantilever web 6j. A first short leg of the L-shaped member 6m projects downwardly from the member 6j opposite catch 6g and a longer second leg extends forwardly, parallel to cantilever web 6j but offset from the plane thereof. As seen in FIGS. 3, 4 and 5, member 6m extends forward edges of the side walls of base 6. As seen in FIGS. 4 and 5, cantilever web 6j is flexible and may be deflected upwardly about the connection points 6k by applying a rearward force in the direction of arrow F (FIG. 4) on the end of member 6m. Conversely, cantilever web 6j may be deflected downwardly as shown in FIG. 5 by the insertion of a tool T into the space between web 6j and member 6m and, using the forward edge of web 6j as a fulcrum, pivoting the tool counterclockwise in the direction of arrow R.

Base 6 is attached to DIN rail 22 before circuit breaker 2 is attached to the adapter assembly 4, either by directly forcing the rear of base 6 against the DIN rail to deflect catch 6g outward until it snaps over the corresponding edge of the rail, or by hooking slot 6h over the edge of lower flange 22b, and pulling base 6 upwardly to deflect the web 6j sufficiently to permit rotation of base 6 counterclockwise to move tab 6e past the edge of upper flange 22a. Upon release of the base member 6, web 6j restores to its original shape and base 6 is retained firmly on DIN rail 22. The firmness of such attachment is enhanced when circuit breaker 2 is attached to base 6 inasmuch as the rear surface of the housing of circuit breaker 2 depresses the projecting forward end of member 6m flush with the forward edges of the side walls of base member 6, thereby imparting a clockwise bending moment to cantilever web 6j as shown in FIG. 4. However, it will be noted that such bending of cantilever web 6j causes catch 6g to rotate clockwise, thereby reducing the width of slot 6h. With the lower flange 22b of DIN rail 22 in place within slot 6h, catch 6g is permitted only minor movement to take up clearance spaces between the slot 6h and flange 22b before pinching against flange 22b. Accordingly, as shown in FIG. 1, member 6m becomes bowed when circuit breaker 2 is attached, thereby applying a constant pinching pressure on lower flange 22b as well as applying a compressive pressure against the opposite edges of flanges 22a and 22b by the upwardly directed component of the arc of the distal end of cantilever web 6j. This pressure and pinching movement not only maintains the engagement between DIN rail 22 and mounting base 6 of adapter 4 firm, it provides sufficiently tight pinching to prevent lateral movement of mounting base 6 along the DIN rail.

Referring to FIG. 5, the mounting base 6 may be removed from DIN rail 22 by first removing circuit breaker 2 and then inserting a tool such as the blade of a screwdriver into the space between cantilever web 6j and member 6m. The blade of screwdriver T is then pivoted upward (counterclockwise) until it abuts the lower forward edge of cantilever web 6j, this edge serving as a fulcrum for the screwdriver. Continued counterclockwise rotation of the screwdriver in the direction of arrow R causes the blade to pull catch 6g downward, releasing the edge of lower flange 22b such that the adapter 4 may be rotatably lifted forwardly out of engagement with DIN rail 22.

Mounting base 6 is provided with a hole 6n through the rear surface near the lower end and a slot 6p in the upper end for direct bolted attachment to a panel or enclosure wall 32 by screws 34 extending through the hole 6n and slot 6p, respectively, and through aligned holes in panel 32 to threadably receive nuts 36 thereon, as shown in FIG. 6. Panel or wall 32 may have frusto-conical bosses 32a projecting forwardly at the ares through which screws 34 extend to accommodate the projecting shanks of such screws, similarly to bosses 24a in FIG. 1. Alternatively, circuit breaker 2 may be mounted within a cutout opening in a forward panel or enclosure wall in a manner well known in the art and adapter 4 attached to the rear surface of breaker 2 as aforedescribed, solely to provide a wiring connector terminal for the circuit breaker.

In the event that two or three pole circuit breaker devices are required, a mounting plate 40 is provided as shown in FIG. 7. Plate 40 comprises a repeating segment pattern such as that shown at 40a to the left of the dotted line. Each segment such as 40a comprises a pair of oppositely projecting central tabs 40b and 40c which are coplanar with the major plane of the mounting plate 40. Right angle tabs 40d and 40e are located on either side of tabs 40b and 40c, respectively, and spaced therefrom by slots 40f. It can be seen that three such segments exist in the mounting plate 40 shown in FIG. 7.

FIG. 8 shows plate 40 with three mounting base members 6, 6' and 6" attached thereto. Plate 40 is disposed in the recessed area 6d against the rear surface of base 6 similar to DIN rail 22. Lower tab 40c is inserted in the slot 6h and base 6 is then forced upwardly with respect to plate 40 so as to deflect cantilever web 6j downwardly to permit the upper tab 40b to engage in slot 6f. As seen in FIG. 8, tab 6e and the distal end of cantilever member 6j have a width which is essentially the same as the distance between adjacent right angle tabs 40d or 40e such that the tabs extend alongside these portions of base member 6, thereby interlocking base 6 laterally with respect to plate 40. Thus as shown in FIG. 8, a unitary assembly of three mounting bases is provided that can be bolted in place in an enclosure or to a panel by a pair of screws such as 34 extending through any one of the slots 6p, 6p', 6p" and any one of the holes 6n, 6n', 6n". A two pole assembly may be made by cutting the mounting plate along the dotted line shown in FIG. 7 to remove one segment, thereby leaving only two segments on the remaining plate and attaching two mounting bases 6 thereto.

The foregoing has described an adapter assembly for a standard circuit breaker of the type for bolt-on or plug-in connection to the bus structure of a power distribution panelboard, the adapter assembly having first terminal means connected to the circuit breaker terminal and second terminal means providing a wiring connector. Although the invention has been described in a preferred embodiment, it is to be understood that it is susceptible to various modifications with departing from the scope of the appended claims.

We claim:

1. In combination with a circuit breaker having a terminal adapted to be connected to bus structure of a distribution panelboard and a hook adapted to engage a mounting rail of said distribution panelboard, an adapter connecting said circuit breaker for use with electrical control apparatus not having said bus structure, said adapter comprising:
    a base adapted to be mounted to support structure of said apparatus, said base comprising means defining opposed slots for receiving opposite edges of a mounting member, said circuit breaker being removably mounted to said base;
    an electrical conductor carried by said base having first terminal means cooperably connected to said circuit breaker terminal and second terminal means comprising a wiring lug; and
    a flange structurally cooperable with said circuit breaker hook securing said circuit breaker to said adapter in collaboration with said cooperably connected circuit breaker terminal and said first terminal means.

2. The combination defined in claim 1 wherein said means defining one of said opposed slots comprises catch means disposed at a distal end of a cantilever portion of said base, said cantilever portion being deflectable to provide snap-fit attachment of said base to said mounting member.

3. The combination defined in claim 2 wherein said mounting member comprises an elongated channel mounted to said support structure, of said channel having a pair of flanges extending in opposite directions therefrom, wherein distal edges of said pair of flanges comprise said opposite edges.

4. The combination defined in claim 3 wherein said cantilever portion comprises means extending from said distal end of said cantilever portion, said means being offset from a plane containing said cantilever portion, said circuit breaker depressing said offset means, deflecting said distal end against a respective opposite edge of said channel.

5. The combination defined in claim 4 wherein said catch means cooperates with a surface of said base to define said one of said slots, said catch means comprising a projection on said distal end of said cantilever member spaced from said surface, said slot comprising space between said projection and said surface, deflection of said cantilever member distal end moving said distal end arcuately toward said surface of said base, pinching a respective one of said flanges between said projection and said surface.

6. The combination defined in claim 5 wherein said offset means extending from said distal end of said cantilever portion comprises an L-shaped member having a first leg projecting normal to said plane and a second leg projecting from said first leg substantially parallel to said cantilever portion and spaced therefrom, a distal end of said second leg being depressed by said circuit breaker secured to said adapter.

7. The combination defined in claim 6 wherein said base is separable from said channel by inserting a tool between said second leg and said cantilever portion, pivoting said tool about a fixed end of said cantilever portion to pivot said distal end away from said respective one of said flanges.

8. The combination defined in claim 2 wherein said mounting member comprises a plate having a plurality of opposed pairs of tabs, ends of a respective opposed pair of said tabs comprising said opposite edges received in said opposed slots of a respective base, a plurality of said bases being attached to said plate in juxtaposed relation for mounting as a unit to said support structure.

9. The combination defined in claim 8 wherein said plate and said bases comprises cooperating interlock structure preventing lateral movement of said bases on said plate.

10. A mounting base for mounting an individual circuit breaker having a hook at one end and a terminal at an opposite end to a structural support member of hardwired electrical control apparatus, said mounting base comprising:
    a flange cooperable with said hook of said circuit breaker for structurally attaching said one end of said circuit breaker to said mounting base;
    a conductor having first terminal means directly connectable to said terminal of said circuit breaker for securing said opposite end of said circuit breaker to said base, and having second terminal means comprising a wiring connector; and means for attaching said mounting base to a pair of outwardly oppositely directed edges of said structural support member.

11. A mounting base as defined in claim 10 wherein said means for attaching said mounting base comprises means defining opposed slots for respectively receiving said outwardly edges, oppositely directed said means defining at least one of said slots being resiliently displaceable for snap-on attachment of said mounting base to said structural support member.

12. A mounting base as defined in claim 11 wherein said means defining said at least one of said slots comprises a surface of said base and a projection spaced from said surface and disposed substantially parallel thereto, said projection extending from a distal end of a resilient cantilever portion of said base and said at least one of said slots being a space between said surface and said projection.

13. A mounting base as defined in claim 12 wherein said cantilever portion comprises means for engagement by said circuit breaker attached to said mounting base, said engagement deflecting said distal end arcuately toward said support member, reducing said space between said projection and said surface and thereby pinching said support member therebetween, resisting lateral sliding movement of said mounting base along said support member.

14. A mounting base as defined in claim 13 wherein said means on said cantilever portion for engagement by said circuit breaker comprises a member extending from said distal end opposite said projection, spaced from said cantilever portion and extending substantially parallel to said cantilever portion.

15. A mounting base as defined in claim 14 wherein said circuit breaker engages a free end of said member, exerting a force thereon directed parallel to said cantilever portion to apply a bending moment on said cantilever portion at said distal end.

16. A mounting base as defined in claim 15 wherein said cantilever portion distal end is deflectable away from said support member by inserting an elongated object between said cantilever portion and said member and pivoting said elongated object about a fixed end of said cantilever portion to pivot said distal end away from said support member.

17. A mounting base as defined in claim 16 wherein said mounting base is a molded plastic member and said cantilever portions and said member extending from said distal end of said cantilever portion are integrally molded elements of said base.

* * * * *